United States Patent
Ishiko et al.

(10) Patent No.: US 11,414,012 B2
(45) Date of Patent: Aug. 16, 2022

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Yuta Ishiko, Nagoya (JP); Kazuyuki Ishiwata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/369,317

(22) Filed: Jul. 7, 2021

(65) Prior Publication Data
US 2022/0089087 A1 Mar. 24, 2022

(30) Foreign Application Priority Data
Sep. 23, 2020 (JP) .............................. JP2020-159072

(51) Int. Cl.
*B60Q 9/00* (2006.01)
(52) U.S. Cl.
CPC ..................................... *B60Q 9/00* (2013.01)

(58) Field of Classification Search
CPC ............... B60H 1/00657; B60H 1/008; B60W 2556/45; B60W 50/0098; G07C 5/08; G07C 5/0808; G08G 1/096725
See application file for complete search history.

(56) References Cited

U.S. PATENT DOCUMENTS

| | | | |
|---|---|---|---|
| 2010/0010956 A1* | 1/2010 | Bell | G01N 33/0034 702/22 |
| 2020/0393430 A1* | 12/2020 | Onda | G01N 29/036 |
| 2021/0188051 A1* | 6/2021 | Macneille | B60H 3/0035 |
| 2022/0024309 A1* | 1/2022 | Seo | B60W 40/08 |

FOREIGN PATENT DOCUMENTS

JP 2004-168074 A 6/2004

* cited by examiner

*Primary Examiner* — Omeed Alizada
(74) *Attorney, Agent, or Firm* — Sughrue Mion, PLLC

(57) ABSTRACT

In an information processing system, a first acquisition unit acquires information on an odor in a cabin of a vehicle. An inference unit infers whether a source of the odor is a driver of the vehicle based on the information acquired by the first acquisition unit. A determination unit determines content of a notification provided to the driver according to an inference result of the inference unit.

5 Claims, 2 Drawing Sheets

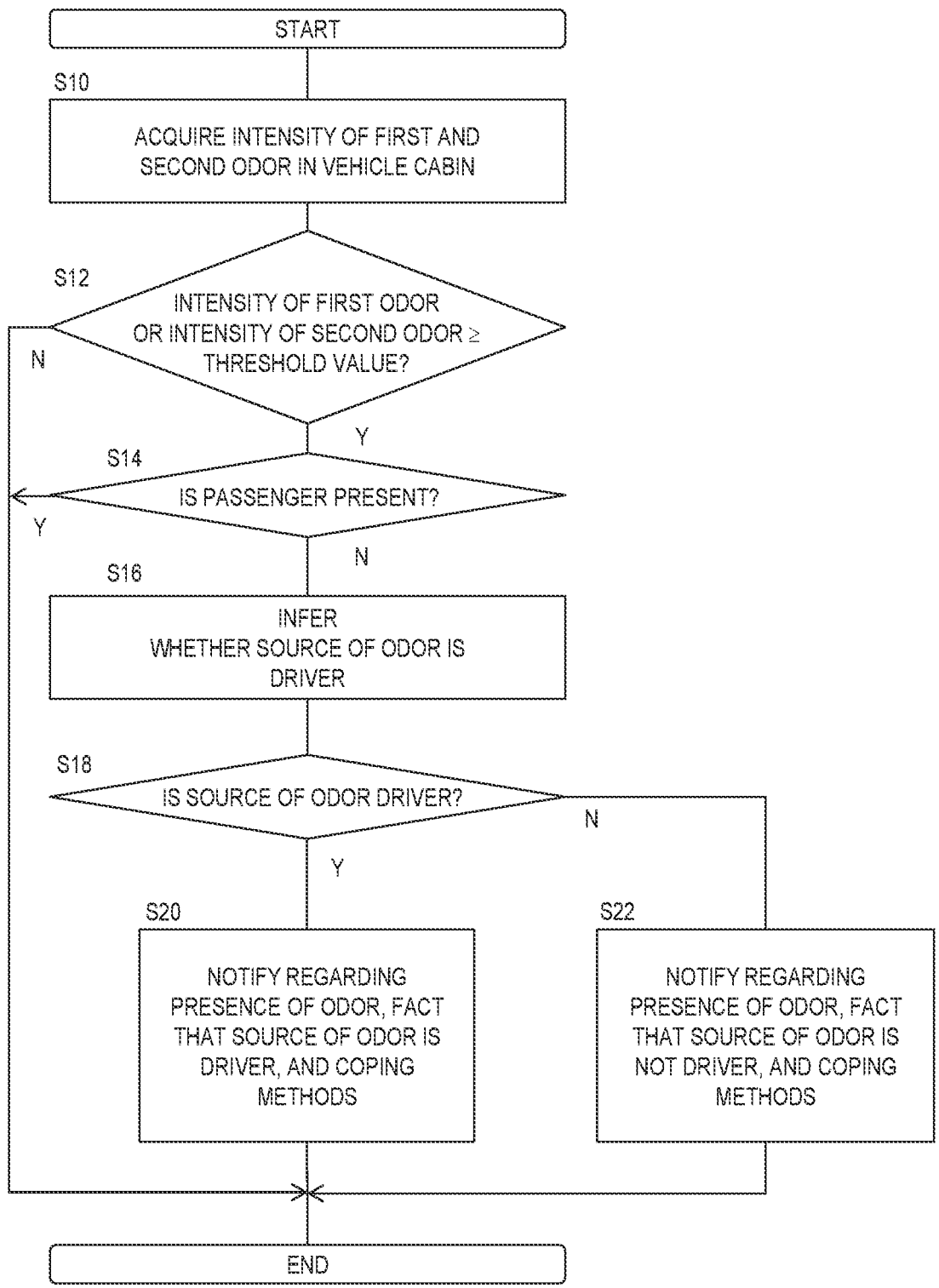

INFORMATION PROCESSING SYSTEM AND INFORMATION PROCESSING METHOD

CROSS-REFERENCE TO RELATED APPLICATION

This application claims priority to Japanese Patent Application No. 2020-159072 filed on Sep. 23, 2020, incorporated herein by reference in its entirety.

BACKGROUND

1. Technical Field

The present disclosure relates to a technology for processing information on an odor in a cabin of a vehicle.

2. Description of Related Art

An air purifying device for a vehicle which eliminates residual odor in a cabin of the vehicle is well-known (see, for example, Japanese Unexamined Patent Application Publication No. 2004-168074). In such a device, an odor sensor detects an odor in the cabin of the vehicle before an occupant boards the vehicle, and when an odor is present, an air purifier eliminates the odor and a scent generator is activated to release a pleasant odor.

SUMMARY

A passenger may bring an odor, such as a cigarette odor or a food odor, into a taxi. In addition, a driver may not notice his/her own body odor. It is desirable to effectively reduce such odors in a cabin of a vehicle.

The present disclosure provides a technology that easily enables a driver to take an action to effectively reduce odor in a cabin of a vehicle.

An information processing system according to an aspect of the present disclosure includes an acquisition unit configured to acquire information on an odor in a cabin of a vehicle, an inference unit configured to infer whether a source of the odor is a driver of the vehicle based on the information acquired by the acquisition unit, and a determination unit configured to determine content of a notification provided to the driver according to an inference result of the inference unit.

Another aspect of the present disclosure is an information processing method. The method includes an acquisition step of acquiring information on an odor in a cabin of a vehicle, an inference step of inferring whether a source of the odor is a driver of the vehicle based on the information acquired in the acquisition step, and a determination step of determining content of a notification provided to the driver according to an inference result in the inference step.

With the present disclosure, it is possible to easily enable a driver to take an action to efficiently reduce odor in a cabin of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a process of a terminal apparatus of FIG. 1.

DETAILED DESCRIPTION OF EMBODIMENTS

Figure 1:
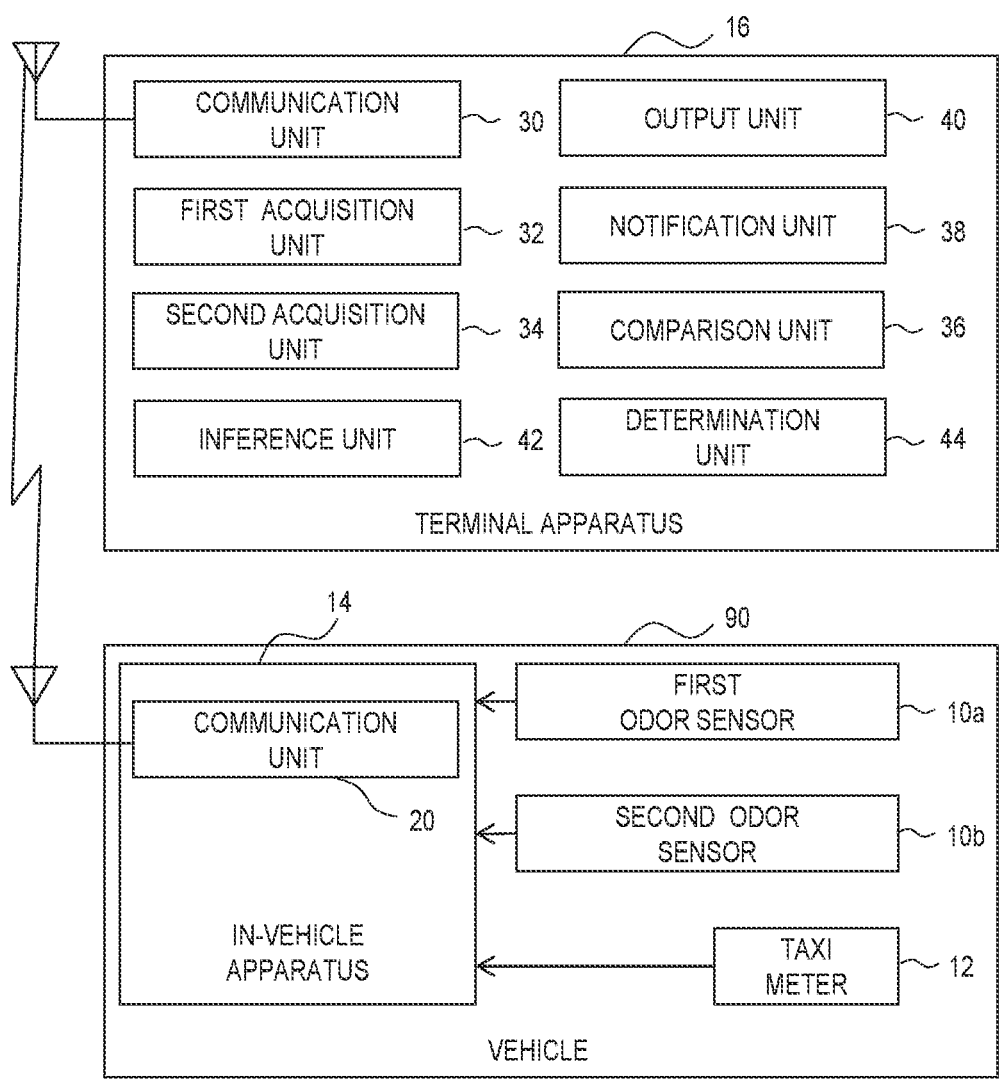
FIG. 1 is a diagram illustrating a functional configuration of an information processing system according to an embodiment.

FIG. 1 illustrates a functional configuration of an information processing system 1 according to an embodiment. The information processing system 1 may be used by, for example, a taxi and a driver thereof. The information processing system 1 includes a first odor sensor 10a, a second odor sensor 10b, a taximeter 12, an in-vehicle apparatus 14, and a terminal apparatus 16. The first odor sensor 10a and the second odor sensor 10b are collectively referred to as odor sensors 10.

The odor sensor 10, the taximeter 12, and the in-vehicle apparatus 14 are mounted on a vehicle 90, which is a taxi.

The terminal apparatus 16 may be a mobile terminal apparatus, such as a smartphone or a tablet, and is used by a driver of the vehicle 90. The terminal apparatus 16 may be included in an in-vehicle apparatus, such as a car navigation system. The terminal apparatus 16 is connected to the in-vehicle apparatus 14 by wireless or wired communication. The wireless communication standard is not particularly limited, and may include, for example, a short-range wireless communication standard, such as Bluetooth® Low Energy (BLE) and Wi-Fi®.

The in-vehicle apparatus 14 includes a communication unit 20. The terminal apparatus 16 includes a communication unit 30, a first acquisition unit 32, a second acquisition unit 34, a comparison unit 36, a notification unit 38, an output unit 40, an inference unit 42, and a determination unit 44.

Configurations of the in-vehicle apparatus 14 and the terminal apparatus 16 can be implemented in hardware, such as a CPU, a memory, or other LSI of any computer, and implemented in software, such as a program loaded in a memory and the like. However, here, functional blocks implemented by a combination of hardware and software are illustrated. Therefore, a person skilled in the art would understand that the functional blocks can be implemented in various forms by hardware alone, software alone, or a combination thereof.

The first odor sensor 10a may be attached to, for example, a ceiling above a driver's seat in a cabin of the vehicle 90 and detects odor near the driver's seat in the vehicle cabin. The second odor sensor 10b may be attached to, for example, a ceiling above a back seat, and detects odor near the back seat in the vehicle cabin. The first odor sensor 10a can detect odor near the driver's seat and the second odor sensor 10b can detect odor near the back seat, and positions to which they are attached is not particularly limited. The first odor sensor 10a may be attached to an inside of a steering wheel or a driver's seat door. The second odor sensor 10b may be attached to an inside of a back seat door. A plurality of first odor sensors 10a and second odor sensors 10b may be provided.

The first odor sensor 10a detects odor and outputs obtained first odor data to the in-vehicle apparatus 14. The second odor sensor 10b detects odor and outputs obtained second odor data to the in-vehicle apparatus 14. The first odor data and the second odor data are collectively referred to as data.

The taximeter 12 is disposed near the driver's seat of the vehicle 90 and calculates a fare. Although not shown, the taximeter 12 includes a first instruction button used for instructing the start of fare calculation and a second instruction button used for instructing the end of the fare calculation. When a passenger boards the taxi, the driver operates the first instruction button. When the first instruction button is operated, the taximeter 12 starts calculating the fare and outputs, to the in-vehicle apparatus 14, first operation information indicating that the first instruction button has been operated. Upon arriving at a destination, the driver operates the second instruction button. When the second instruction button is operated, the taximeter 12 ends calculating the fare and outputs, to the in-vehicle apparatus 14, second operation information indicating that the second instruction button has been operated.

The communication unit 20 periodically transmits the odor data output from the odor sensor 10 to the terminal apparatus 16. The frequency of transmitting the odor data can be appropriately determined by experiments and the like.

When the first operation information or the second operation information is output from the taximeter 12, the communication unit 20 transmits the information to the terminal apparatus 16.

The communication unit 30 of the terminal apparatus 16 receives the odor data, the first operation information, and the second operation information transmitted from the communication unit 20 of the in-vehicle apparatus 14, and outputs the received odor data to the first acquisition unit 32, and outputs the received first operation information and the second operation information to the second acquisition unit 34.

The first acquisition unit 32 acquires intensity of odor in the cabin of the vehicle 90 based on the odor data output from the communication unit 30, and outputs the acquired intensity of the odor to the comparison unit 36. The first acquisition unit 32 acquires intensity of a first odor based on the first odor data, acquires intensity of a second odor based on the second odor data, and outputs the acquired intensity of the odor to the comparison unit 36. A well-known technique can be used to acquire the intensity of the odor.

The comparison unit 36 compares each of the intensity of the first odor and the intensity of the second odor output from the first acquisition unit 32 with a predetermined threshold value, compares the intensity of the first odor with the intensity of the second odor, and outputs comparison results to the inference unit 42. The threshold value can be appropriately determined by experiments and the like, and can be set based on, for example, a threshold value of the intensity of odor at which each of a plurality of subjects shows discomfort.

The second acquisition unit 34 acquires information indicating the presence/absence of a passenger in the vehicle 90 based on the first operation information and the second operation information output from the communication unit 30, and outputs the acquired information indicating the presence/absence of a passenger to the inference unit 42. When the first operation information is supplied, the second acquisition unit 34 acquires information indicating the presence of a passenger in the vehicle 90. When a predetermined time has elapsed since the second operation information was supplied, the second acquisition unit 34 acquires information indicating the absence of a passenger in the vehicle 90. The predetermined time can be appropriately determined by experiments and the like, and may be set to a time longer than the average time required for, for example, a passenger to pay a fare.

Alternatively, when detection data of a door opening/closing sensor (not shown) of the vehicle 90 is acquired from the in-vehicle apparatus 14 and when detection data indicating that opening/closing of a door is executed is supplied after the second operation information is supplied, the second acquisition unit 34 may acquire information indicating the absence of a passenger in the vehicle 90. When information indicating that payment of the fare by a credit card or electronic money is completed is acquired from the in-vehicle apparatus 14 after the second operation information is supplied, the second acquisition unit 34 may acquire the absence of a passenger in the vehicle 90.

When a passenger is absent based on the information of the second acquisition unit 34 indicating the presence/absence of a passenger and the comparison result of the comparison unit 36, and when the intensity of the first odor or the intensity of the second odor is equal to or greater than the threshold value, the inference unit 42 infers whether the source of the odor is the driver of the vehicle 90 and outputs an inference result to the determination unit 44. When a passenger is present or when each of the intensity of the first odor and the intensity of the second odor is less than the threshold value, the inference unit 42 does not execute inference.

The inference unit 42 infers whether the source of the odor is the driver based on which odor sensor 10 from among the plurality of odor sensors 10 has acquired a highest intensity of the odor. When the highest intensity of the odor has been acquired from the first odor sensor 10a, the inference unit 42 infers that the source of the odor is the driver. When the highest intensity of the odor is acquired from the second odor sensor 10b, the inference unit 42 infers that the source of the odor is not the driver.

The determination unit 44 determines content of the notification provided to the driver according to the inference result of the inference unit 42, and outputs the determined notification content to the notification unit 38. When the inference is not executed by the inference unit 42, the determination unit 44 does not determine the notification content. The notification content includes the presence/absence of odor, whether the source of the odor is the driver, and coping methods according to the source of the odor.

The coping methods when the driver is the source of the odor are determined in advance, and may include, for example, at least one of instructions to change clothes, take a shower, and use an antiperspirant having a deodorant effect. The coping methods when the driver is the source may further include at least one of instructions to open a window, switch a mode of an in-vehicle air purifier to an odor elimination mode, activate an in-vehicle deodorizer, and use a deodorant spray.

The coping methods when the driver is not the source are determined in advance, and may include, for example, at least one of instructions to open the window, switch the mode of the in-vehicle air purifier to the odor elimination mode, activate the in-vehicle deodorizer, use the deodorant spray, and clean the inside of the vehicle cabin. When the passenger has eaten in the vehicle cabin, it is possible to eliminate food remaining on a floor mat and a seat by cleaning the inside of the vehicle cabin, thereby reducing the odor.

The notification unit 38 notifies the driver regarding the vehicle 90 of the determined notification content via the output unit 40. The output unit 40 includes a speaker that outputs a voice indicating the notification content. By outputting the voice, a driver who is driving or working can easily recognize the notification. The output unit 40 may further include a display that outputs an image showing the notification content in text.

It is possible to easily enable the driver to take an action to effectively reduce the odor through the notification content determined according to whether the source of the odor is the driver. Therefore, it is possible to prevent a next passenger from feeling uncomfortable due to the odor in the vehicle cabin.

Depending on the driver's sensitivity to odor, the driver may not notice the presence of odor with intensity equal to or greater than the threshold value. Even in that case, the notified driver can easily recognize the presence of the odor that may make others feel uncomfortable.

For example, when the driver is in the vehicle for a relatively long time, his/her body odor or sweat odor can be stronger than at the start of work due to sweating or the like. When the cause of the odor is the driver's body odor or sweat odor, the driver may not notice his/her body odor by only the notification regarding the presence of the odor. The driver who does not notice his/her body odor easily takes a general action to reduce the odor, such as opening the window, switching the mode of the air purifier to the odor elimination mode, activating the deodorizer, and using a deodorant spray. As such, the odor in the vehicle cabin is temporarily reduced, but the odor becomes stronger again.

In the embodiment, since the driver can recognize that he/she is the source of the odor, it is possible to reduce the odor generated from the driver and effectively reduce the odor in the vehicle cabin by executing at least one of changing clothes, taking a shower, and using the antiperspirant according to the coping methods included in the notification content.

Further, since the driver can recognize that the passenger is the source of the odor, it is possible to effectively reduce the odor by, for example, executing at least one of opening the window, switching the mode of the in-vehicle air purifier to the odor elimination mode, activating the in-vehicle deodorizer, using the deodorant spray, and cleaning the inside of the vehicle cabin according to the coping methods included in the notification content. When the passenger brings an odor, such as a cigarette odor or a food odor, into the vehicle and the passenger exits the vehicle, it is possible to reduce the odor with such coping methods.

Further, since the driver is notified regarding the presence of the odor in the vehicle cabin after the passenger exits the vehicle, there is no concern of making the passenger feel uncomfortable even when the driver is notified with a voice that he/she easily notices.

Upon notifying the driver regarding the presence of the odor and the like and when the acquired intensity of the odor becomes less than the threshold value, the notification unit 38 notifies the driver, via the output unit 40, that the odor has been reduced. As such, the driver can easily recognize that he/she may stop taking the action to eliminate or reduce the odor.

FIG. 2 is a flowchart illustrating a process of the terminal apparatus 16 of FIG. 1. The process of FIG. 2 is periodically executed. The first acquisition unit 32 acquires the intensity of the first odor and the intensity of the second odor in the cabin of the vehicle 90 (S10) and when the intensity of the first odor or the intensity of the second odor is not equal to or greater than the threshold value (N in S12), the process ends. When the intensity of the first odor or the intensity of the second odor is equal to or greater than the threshold value (Y in S12) and when a passenger is present (Y in S14), the process ends. When a passenger is absent (N in S14), the inference unit 42 infers whether the source of the odor is the driver (S16) and when the source of the odor is the driver (Y in S18), the notification unit 38 notifies the driver regarding the presence of the odor, the fact that the source of the odor is the driver, and the coping methods (S20), and ends the process. When the source of the odor is not the driver (N in S18), the notification unit 38 notifies the driver regarding the presence of the odor, the fact that the source of the odor is not the driver, and the coping methods (S22), and ends the process.

Second Embodiment

The second embodiment differs from the first embodiment in that in the former, the source of the odor is inferred based on a continued presence of a strong odor. Hereinafter, differences from the first embodiment will be mainly described.

Only one odor sensor 10 is required and is installed at a position where the odor in the vehicle cabin can be detected. Other functional configurations of the information processing system 1 are the same as those of FIG. 1. The first acquisition unit 32 periodically acquires the intensity of the odor in the vehicle cabin.

When the acquired intensity of the odor is equal to or greater than the threshold value and when a passenger is present, the notification unit 38 notifies the driver of the vehicle 90, via the output unit 40, of the presence of the odor in the vehicle cabin after the passenger exits. The driver who recognizes, via the notification, the presence of the odor takes an action, such as opening the window, switching the mode of the in-vehicle air purifier to the odor elimination mode, activating the in-vehicle deodorizer, and using the deodorant spray. At this point, it is not possible to infer the source of the odor.

When the source of the odor is the driver, the odor in the vehicle cabin can be temporarily reduced by, for example, opening the window, but since the odor continues to be generated, it is difficult for the intensity of the odor to be reduced to less than the threshold value.

When a passenger exits, that is, when a passenger is absent in the vehicle 90 and when a period in which the acquired intensity of the odor is equal to or greater than the threshold value is equal to or longer than a predetermined period, the inference unit 42 infers that the source of the odor is the driver. The predetermined period is appropriately set via experiments. For example, when the passenger is the source of the odor, the predetermined period is set based on a time when the intensity of the odor in the vehicle cabin is less than the threshold value due to the driver's action to reduce the odor and the passenger exiting the vehicle, and the predetermined period may be, for example, approximately 10 minutes to several tens of minutes.

When the inference unit 42 infers that the source of the odor is the driver, the determination unit 44 determines the notification content including the fact that the source of the odor is the driver and the coping methods when the driver is the source. The notification unit 38 notifies the driver regarding the determined notification content. As such, the driver can recognize that he/she is the source of the odor, and can effectively reduce the odor in the vehicle cabin by executing the coping methods included in the notification content.

On the other hand, when the source of the odor is the passenger, since the passenger exits the vehicle, it is easy to reduce the odor in the vehicle cabin in a relatively short time by, for example, opening the window, and it is possible to reduce the intensity of the odor to less than the threshold value within the predetermined period.

When a passenger exits the vehicle, that is, when a passenger is absent in the vehicle 90, and when the period in which the acquired intensity of the odor is equal to or greater than the threshold value is equal to or longer than the predetermined period, the inference unit 42 infers that the source of the odor is not the driver. That is, when the intensity of the odor becomes less than the threshold value within the predetermined period, the inference unit 42 infers that the source of the odor is not the driver.

When the inference unit 42 infers that the source of the odor is not the driver, the determination unit 44 determines the notification content including the facts that the source of the odor is not the driver and that the odor has been reduced. The notification content does not have to include the fact that the source of the odor is not the driver. The notification unit 38 notifies the driver regarding the determined notification content. The driver can recognize, via the notification, that he/she may stop taking the action to reduce the odor.

According to the present embodiment, it is possible to reduce the number of odor sensors 10 and obtain the same advantageous effect as that of the first embodiment.

The present disclosure has been described as above based on the embodiments. The embodiments are merely examples, and it is understood by those skilled in the art that various modifications can be made for each component and combination of each process, and that such modifications are also within the scope of the present disclosure.

In the embodiment, the terminal apparatus 16 includes the first acquisition unit 32, the second acquisition unit 34, the comparison unit 36, the notification unit 38, the inference unit 42, and the determination unit 44, but they may be provided in the in-vehicle apparatus 14. In this case, the notification unit 38 of the in-vehicle apparatus 14 notifies the driver regarding the presence of odor in the vehicle cabin via the communication unit 20, the communication unit 30 of the terminal apparatus 16, and the output unit 40. Further, the in-vehicle apparatus 14 may include the first acquisition unit 32 and the second acquisition unit 34, and the comparison unit 36, the notification unit 38, the inference unit 42, and the determination unit 44 may be provided in the terminal apparatus 16. The in-vehicle apparatus 14 may include the first acquisition unit 32, the second acquisition unit 34, the comparison unit 36, the inference unit 42, and the determination unit 44, and the notification unit 38 may be provided in the terminal apparatus 16. In these modified examples, the degree of freedom in the configuration of the information processing system 1 can be improved.

The terminal apparatus 16 and the in-vehicle apparatus 14 may be integrally configured as an in-vehicle apparatus, such as a car navigation system. In this modified example, the degree of freedom in the configuration of the information processing system 1 can also be improved.

The notification content may only include the presence of the odor and whether the source of the odor is the driver, or may only include the presence of the odor and the coping methods. In this modified example, the process can be simplified.

In the first embodiment, the notification content may be notified at a timing at which it is determined that the intensity of the odor is equal to or greater than the threshold value regardless of the presence/absence of a passenger. In this case, it is preferable that the output unit 40 notifies the driver by vibration and an image without using a voice. It is preferable that the terminal apparatus 16 is a mobile terminal such that the passenger cannot see the image. In this modified example, it is possible to simplify the process of the information processing system 1 and make the passenger feel less uncomfortable. Further, when the driver can confirm the notification while waiting at a traffic light, he/she can take an action, such as opening the window, while the passenger is on board.

The first and the second embodiments may be applied to a vehicle dispatch-type or a vehicle sharing-type ride-sharing service. In the ride-sharing service, a taximeter is not provided in a vehicle. In this case, the second acquisition unit 34 acquires the presence of a passenger in the vehicle 90 while the vehicle 90 is traveling between a boarding position and an exit position designated by a user. Alternatively, seating sensors may be provided in a passenger seat and the back seat of the vehicle 90, and the second acquisition unit 34 may acquire the presence/absence of a passenger in the vehicle 90 based on detection data of the seating sensors.

What is claimed is:

1. An information processing system comprising:
   an acquisition unit configured to acquire information on an odor in a cabin of a vehicle;
   an inference unit configured to infer whether a source of the odor is a driver of the vehicle based on the information acquired by the acquisition unit; and
   a determination unit configured to determine content of a notification provided to the driver according to an inference result of the inference unit,
   wherein:
   the acquisition unit is configured to periodically acquire intensity of the odor in the cabin of the vehicle; and
   in a case where there are no passengers in the vehicle and a period in which the acquired intensity of the odor is equal to or greater than a threshold value is equal to or longer than a predetermined period, the inference unit is configured to infer that the source of the odor is the driver.

2. The information processing system according to claim 1, wherein:
   the acquisition unit is configured to acquire the intensity of the odor from a plurality of odor sensors arranged at different positions in the cabin of the vehicle; and
   the inference unit is further configured to infer whether the source of the odor is the driver, based on which of the odor sensors acquires a highest intensity of the odor.

3. The information processing system according to claim 1, wherein the content of the notification includes whether the source of the odor is the driver.

4. The information processing system according to claim 1, wherein the content of the notification includes a coping method according to the source of the odor.

5. An information processing method comprising:
   an acquisition step of acquiring information on an odor in a cabin of a vehicle;
   an inference step of inferring whether a source of the odor is a driver of the vehicle based on the information acquired in the acquisition step; and
   a determination step of determining content of a notification provided to the driver according to an inference result in the inference step,
   wherein:
   the acquisition step includes periodically acquiring intensity of the odor in the cabin of the vehicle; and
   in a case where there are no passengers in the vehicle and a period in which the acquired intensity of the odor is equal to or greater than a threshold value is equal to or longer than a predetermined period, the inference step includes inferring that the source of the odor is the driver.

* * * * *